United States Patent [19]

Nakasaki et al.

[11] Patent Number: 4,757,850
[45] Date of Patent: Jul. 19, 1988

[54] TIRE FOR MOTORCYCLES

[75] Inventors: Eiji Nakasaki, Kakogawa; Hisashi Shirashoji; Katsuyuki Hoshikawa, both of Kobe; Takao Kamijo, Toyonaka; Kazushige Ikeda, Akashi; Yasuhiro Inoue, Himeji; Takeo Kato, Nishinomiya, all of Japan

[73] Assignee: Sumitomo Rubber Industries, Ltd., Kobe, Japan

[21] Appl. No.: 854,675

[22] Filed: Apr. 18, 1986

Related U.S. Application Data

[62] Division of Ser. No. 636,768, Aug. 1, 1984, abandoned.

[30] Foreign Application Priority Data

Aug. 1, 1983 [JP] Japan ................................ 58-141703

[51] Int. Cl.[4] ...................... B60C 11/04; B60C 15/06
[52] U.S. Cl. ......................... 152/209 R; 152/209 NT; 152/546; 152/554
[58] Field of Search .......... 152/209 R, 209 A, 209 B, 152/209 NT, 209 WT, 209 D, 538, 454, 546, 535, 541, 560, 554

[56] References Cited

U.S. PATENT DOCUMENTS

| 4,456,046 | 6/1984 | Miller | 152/209 R |
| 4,589,461 | 5/1986 | Ohkuni et al. | 152/209 R |

FOREIGN PATENT DOCUMENTS

| 3242323 | 6/1983 | Fed. Rep. of Germany . | |
| 58-22704 | 2/1983 | Japan . | |
| 58-71205 | 4/1983 | Japan | 152/559 |
| 1222759 | 2/1971 | United Kingdom . | |
| 2002297 | 7/1978 | United Kingdom . | |
| 2096951 | 4/1982 | United Kingdom . | |
| 2102354 | 2/1983 | United Kingdom | 152/554 |
| 2102746A | 2/1983 | United Kingdom . | |

Primary Examiner—Michael Ball
Assistant Examiner—Ramon R. Hoch

[57] ABSTRACT

Radial tires for motorcycles comprising a tread portion, side wall portions, bead portions, a carcass, bead apexes made of a rubber having a high hardness, and optionally reinforcing cord layers arranged outside the bead apexes, said tread portion having shoulder grooves at the shoulder portion thereof and center grooves at the center portion thereof and the depth of the shoulder grooves being from 5 to 50% of the depth of the center grooves, whereby cracking of the shoulder groove bottom caused by providing the bead apexes made of a hard rubber or the reinforcing cord layers is prevented.

4 Claims, 1 Drawing Sheet

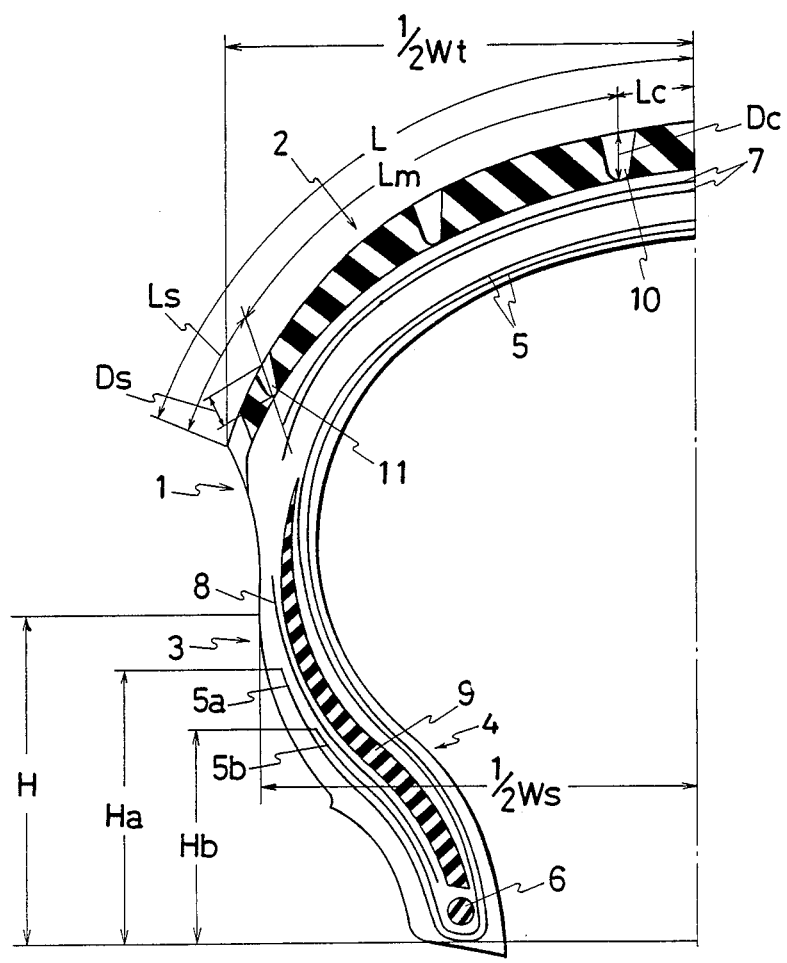

TIRE FOR MOTORCYCLES

This application is a division of application Ser. No. 636,768 filed Aug. 1, 1984, now abandoned.

BACKGROUND OF THE INVENTION

The present invention relates to a tire for motorcycles, and more particularly to a tire for motorcycles which has an excellent durability in high speed running of the motorcycles.

With recent prevalence of pavement, it has been intended to raise the speed of vehicles and, therefore, motorcycle tires are also required to possess characteristics capable of accommodating the high speed running.

Generally, for the carcass of motorcycle tire, widely employed is a cross-ply structure, that is, such a structure that ply cords of the carcass intersect each other at an angle of about 15° to 60° with respect to the circumferential direction of the tire. The reason is that the tire for motorcycle is basically different from that for four-wheel vehicles such as passenger car, particularly, in motional functions at the time of turning, and is required to have characteristics to maintain stable running while resisting centrifugal force acting upon the motorcycle body with a force (camber thrust) generated when the motorcycle is tilted during turning at a large angle to a plane perpendicular to the road surface (when a large degree of camber angle is given), which horizontally acts along the direction in which the camber angle is given. Therefore, the motorcycle tire is strengthened in transverse stiffness by employing a carcass of the cross-ply structure as described above so as to maintain the camber thrust. The radial structure inferior in transverse stiffness has been scarcely adopted for the motorcycle tires from the above-mentioned point of view. However, the tire of the cross-ply structure has the drawbacks that transverse vibration (weave phenomenon) of the motorcycle body resulting from cornering power and transverse stiffness of the tire occurs during high speed running and that the abrasion resistance is low. As countermeasures to such problems, the cord angle of carcass to the circumferential direction of the tire is lowered or the number of carcass plies is increased for increasing the tire stiffness, but the drawbacks attributable to the structure cannot completely be removed as far as the cross-ply structure is employed.

Radial tires are superior in steering stability in high speed running and abrasion resistant, though they have the drawback as mentioned above. In order to eliminate the drawback while utilizing these excellent characteristics, it is proposed to arrange bead apexes made of a rubber having a high hardness or reinforcing layers of fiber cords extending from a bead portion to a side wall portion, as disclosed in Japanese Unexamined Patent Publication (Tokkyo Kokai) No. 22704/1983. According to such a structure, the transverse stiffness of the tire is increased and the camber thrust is greatly improved. However, the flexing and deforming zone of the tire shifts from the side wall portion to the shoulder portion of the tire, and it issues another problem that a stress is caused conjointly with the above zone being located at the breaker end which is high in stiffness and consequentially cracks are generated at the bottoms of shoulder grooves positioned at the both end portions of the tread.

It is an object of the present invention to solve the problems arising from adopting the radial structure.

A further object of the present invention is to provide a radial tire for motorcycles having an improved durability.

These and other objects of the present invention will become apparent from the following description and the accompanying drawing.

SUMMARY OF THE INVENTION

It has now been found that cracking at the bottom of the shoulder grooves can be effectively prevented by setting the dimensions of the grooves of the tread within a specific range.

In accordance with the present invention, there is provided a tire for motorcycles comprising a tread portion, side wall portions extending inwardly from the both ends of said tread portion in the radial direction, bead portions positioned at the radially inward ends of the side walls, a toroidal carcass composed of cords which extend approximately parallel with each other in the radial direction of the tire and of which the both end portions are turned up around bead cores, a breaker arranged on the radially outer side of said carcass so that the cords thereof are extended at an angle of 5° to 45° to the circumferential direction of the tire, and bead apexes made of a hard rubber and extending from locations just above said bead cores toward the side wall portions, said tread portion having shoulder grooves at the shoulder portion thereof and center grooves at the center portion thereof and the depth of said shoulder grooves being from 5 to 50% of the depth of said center grooves.

BRIEF DESCRIPTION OF THE DRAWING

The accompanying drawing is a partial section view of the tire for motorcycles of the present invention.

DETAILED DESCRIPTION

An embodiment of the present invention will be described with reference to the accompanying drawing.

In the drawing, tire 1 comprises a tread portion 2, side wall portions 3 extending inwardly from the both ends of the tread 2 in the radial direction of the tire, and bead portions 4 positioned at the radially inward ends of the side walls 3. The tread 2 extends over the crown of carcass 5 from the center to the both ends and approximately parallelly with the arcuate configuration of the crown. The width $W_t$ of the tread usually exceeds the maximum width $W_s$ between the both side walls, whereby camber thrust generated when the tire is tilted can be maintained.

The tread portion 2 is provided with center grooves 10 and shoulder grooves 11 at the center portion $L_c$ and the shoulder portion $L_s$ thereof, respectively. The depth $D_s$ of the shoulder groove is selected within the range of 5 to 50% of the depth $D_c$ of the center groove 10. The term "shoulder portion" $L_s$ as used herein means a zone extending from the end of the tread to a point not exceeding 30% of half L of the arcuate distance on the tread surface. The term "center portion" $L_c$ as used herein means a zone extending from the center of the tread to a point not exceeding 30% of half L of the arcuate distance on the tread surface. Since the shoulder portions $L_s$ are located over the both ends of breaker 7 and the upper end of bead apex 9, stress is liable to be caused thereat. Particularly, stress concentration tends to occur at the bottom of the shoulder groove 11. The present inventors have solved the problems by providing a tire with grooves reduced in depth. When the depth $D_s$ of the shoulder groove 11 exceeds 50% of the depth $D_c$ of the center groove 10, cracking occurs at the bottom of the shoulder grooves as mentioned above and, on the other hand, when $D_s$ is less than 5% of $D_c$, a problem arises in the grip characteristic of the tire at the time of cornering. Preferably, the depth $D_s$ of the shoulder groove 11 is from 15 to 30% of the center groove depth $D_c$. In the present invention, it is preferable that the depths of grooves arranged from the center of the tread toward the shoulder portion are reduced little by little in the order of $L_c$, $L_m$ and $L_s$.

Carcass 5 of the tire shown in the drawing is composed of two plies, and each of the both ends thereof is turned up around a bead core 6 outwardly from the inside of the bead core 6 and terminates at the bead portion 4 or the side wall portion 3. It is desirable that the turned-up end portion $5_a$ located outside in the bead portion is extended to a higher position than that of the turned-up end portion $5_b$ located inside in the bead portion so as to completely cover the above inner turned-up end portion, thereby mitigating stress concentration at the inner turned-up end portion. Further, for reinforcing the side wall 3, heights $H_b$ and $H_a$ between the bead base and each of the inner turned-up end $5_b$ and the outer turned-up end $5_a$ are preferably determined to be within the ranges of from 55 to 65% and from 70 to 100% of the height H between the bead base and a position where the width of the side wall is the largest, respectively.

Cords in the above-mentioned carcass are arranged in parallel or approximately parallel with the radial direction of the tire. The expression "approximately parallel" as used herein means that cords are arranged at an angle of not more than 10° with respect to the radial direction of the tire. When the cords are arranged at angles of more than 10°, excellent characteristics of the radial tire to be exhibited during high speed running cannot be obtained. Textile materials usually used for the codes of the carcass are used in the present invention, e.g. Nylon, polyester, rayon, and aromatic polyamide fibers.

In this invention, one or more plies are used for the carcass. In addition to a structure in which the carcass is turned-up at its both ends outwardly from the inside around the bead cores 6 as shown in the drawing, another structure in which the both end portions of the carcass are turned-up from the outside to the inside around the bead cores or further one in which the former two are combined, may be employed. The structure shown in the drawing is preferable.

The breaker 7 of the tire according to the present invention is arranged over almost the full width of the tread portion 2. thereby increasing hooping effect of the tread. Cords of the breaker are arranged at an angle of 10° to 45°, preferably 20° to 35°, with respect to the circumferential direction of the tire. When the angle of the cord arrangement is too small, the tread stiffness is increased, whereby impact caused by small pebbles scattered on the road or by ruggedness of the road is felt stronger by the driver and the running stability as well as feeling of riding of the motorcycle is impaired. On the other hand. a too large angle impedes the steering stability at the time of high speed running. Usually, the breaker 7 is composed of two plies. The width of at least one of them is adapted to be substantially equal to the width $W_t$ of the tread. Textile materials used for the cords of the breaker may be the same as those used for a reinforcing layer mentioned after. In particular, it is preferable that aromatic polyamide cords having a tensile strength of not less than 7 g/d and an initial modulus of not less than 200 g/d. steel cords, polyester cords having a high modulus of elasticity and rayon cords are used and embedded into a rubber having a modulus at 300% elongation of 120 to 240 kg/cm$^2$.

In the present invention, there may be provided reinforcing layers each composed of fiber cord layers and extending from the bead toward the side wall so that the upper end thereof preferably terminates at a position near the shoulder portion. The lower end of the reinforcing layer may be wound upwardly around the bead core 6. The cords of the reinforcing layer intersect the carcass cords at a certain fixed angle to reinforce the side wall portion. For improving the cornering characteristic without impairing comfortableness during riding, it is necessary to increase transverse resiliency coefficient without increasing vertical resiliency coefficient and, therefore, it is necessary to arrange the cords of the reinforcing layer 8 at an angle of 45° to preferably from 60° to 80° to the circumferential direction. Each of both ends of the reinforcing layer is preferably laid in layers with the above-mentioned turned-up end portions $5_a$ and $5_b$ of the carcass for reducing concentration of stress in this zone. Materials usable for cords are organic fibers such as Nylon, polyester, rayon, aromatic polyamide fibers. Steel cords are also used as well as the cords of the above textile materials. The reinforcing layer 8 may be disposed, as shown in the drawing, between the outer surface of bead apex 9 mentioned after and the turned-up end portions $5_a$ and $5_b$, or disposed between the inner surface of the bead apex 9 and the carcass ply.

In the present invention, a bead apex 9 made of hard rubber and extending from the bead core 6 toward the side wall while decreasing in thickness is arranged between the carcass and the turned-up end portion thereof or the reinforcing layer, thereby reinforcing the transverse stiffness of a portion between the bead and the side wall. The upper end of the bead apex 9 is preferably extended to the zone near the tread and overlapped with each of the both ends of the breaker 7. The hardness of the bead apex is from 65° to 95°, preferably from 85° to 95°, in terms of JIS A hardness.

Since the radial structure is adopted in the carcass and the breaker is used, the tire for motorcycles of the present invention has the advantages that the rolling resistance is decreased, while the durability in high speed running which is an inherent characteristic of the radial structure, namely critical speed for generation of standing wave, is further increased. Also, because of the arrangement of the breaker, the turned-up end portion of the carcass and the reinforcing layer in a particular structure, a low transverse stiffness which is a drawback peculiar to the radial tire is improved, thus the camber thrust is increased to enable a stable turning and also the so-called "wobbling phenomenon" is effectively prevented. Also, according to the present invention, stress in the tread portion can be decreased by optimization of the dimensions of the grooves in this zone and accordingly cracking at the bottoms of grooves can be prevented.

The present invention is more specifically described and explained by means of the following Examples.

EXAMPLE 1 TO 3 AND COMPARATIVE EXAMPLES 1 AND 2

Rear wheel tires of 120/90-18 in size having the structure shown in the accompanying drawing and having a partly modified structure were made (Examples 1 to 3 embodying the present invention). They were subjected to a drum test and an on-the-motorcycle test for estimating the tire performance. For comparison, a conventional cross-ply tire and a conventional radial tire were also used in the tests. Detailed specification of these tires are shown in Table 1.

The drum test was carried out under the conditions: 60 inches in diameter of drum, 200 kg. in load on the tire and 2.25 kg/cm² in internal load.

In Table 1, the camber thrust is shown as a relative value based on the value for the cross-ply tire (Com. Ex. 2) regarded as 100. The higher the value, the better.

The standing wave generating speed (speed at which the standing wave was generated) was measured by raising the running speed from 150 km/hour at intervals of 10 km/hour and 10 minutes and visually observing occurrence of standing wave.

A speed at which vibration is spontaneously generated when a motorcycle is run on the highway road at a high speed was evaluated by feeling.

The abrasion resistance of the tread center portion is shown as a relative value base on the value for the cross-ply tire (Com. Ex. 2) regarded as 100. The smaller the value, the higher the abrasion resistance.

To generation of cracks, 5-step visual evaluation was applied with respect to the size of crack at the bottom of the shoulder groove. The higher the point, the higher the quality.

The motorcycle used for evaluation of the tire performance was the Kawasaki GPZ 750 to which a cross-ply tire of 100/90V19 for the front wheel and the tire shown in Table 1 for the rear wheel were fitted.

The results are shown in Table 1.

TABLE 1

|  | Ex. 1 | Ex. 2 | Ex. 3 | Com. Ex. 1 | Com. Ex. 2 |
|---|---|---|---|---|---|
| (1) Carcass | | | | | |
| Structure | Radial | Radial | Radial | Radial | Cross-ply |
| No. of plies | 2 | 2 | 2 | 2 | 4 |
| Angle of cord arrangement to circumferential direction | 90° | 90° | 90° | 90° | 34° |
| Textile material | Nylon | Nylon | Nylon | Nylon | Nylon |
| Denier | 2/1260d | 2/1260d | 2/1260d | 2/1260d | 2/1260d |
| (2) Breaker | | | | | |
| No. of plies | 2 | 2 | 2 | 2 | — |
| Textile material | Aromatic polyamide | Aromatic polyamide | Aromatic polyamide | Aromatic polyamide | — |
| Denier | 2/1500d | 2/1500d | 2/1500d | 2/1500d | — |
| Angle of cord arrangement to circumferential direction | 22° | 22° | 22° | 22° | — |
| (3) Reinforcing layer | | | | | |
| Textile material | Nylon | Nylon | — | Nylon | — |
| Angle of cord arrangement to circumferential direction | 75° | 75° | — | 75° | — |
| (4) Bead apex | | | | | |
| Hardness (JIS A hardness) | 85° | 95° | 95° | 85° | — |
| Height of upper end from bead base | 48 mm | Note 1 | Note 1 | 48 mm | — |
| (5) Shoulder groove | | | | | |
| Depth ($D_S$) | 1.5 mm | 1.5 mm | 1.5 mm | 7.5 mm | 7.5 mm |
| Position ($L_s$) | 6 mm | 6 mm | 6 mm | 6 mm | 6 mm |
| Center groove | | | | | |
| Depth ($D_c$) | 7.5 mm | 7.5 mm | 7.5 mm | 7.5 mm | 7.5 mm |
| Position ($L_s$) | 8 mm | 8 mm | 8 mm | 8 mm | 8 mm |
| Drum test | | | | | |
| Camber thrust | 90 | 95 | 84 | 90 | 100 |
| Standing wave generating speed | 230 km/h | 245 km/h | 220 km/h | 230 km/h | 160 km/h |
| On-the-motorcycle test | | | | | |
| Speed at which vibration is spontaneously generated | None up to 200 km/h | None up to 200 km/h | None up to 200 km/h | None up to 200 km/h | 160 km/h |
| Convergence of tire when subjected to extraneous disturbance | Yes | Yes | Yes | Yes | Yes |
| Abrasion resistance | 55 | 55 | 55 | 60 | 100 |
| Cracks generated | 5 | 5 | 5 | 3 | 5 |

Note 1: The upper end of the bead apex was adapted to overlap the 2nd breaker by 10 mm.

While the invention has been shown and described with reference to a preferred embodiment thereof, it is to be understood that various changes and modifications may be made in the invention without departing from the spirit and scope thereof.

What we claim is:

1. A tire for motorcycles comprising a crowned tread portion, side wall portions extending inwardly from the both ends of said tread portions in the radial direction, bead portions positioned at the radially inward ends of said side wall portions, a two ply toroidal carcass composed of cords which extend approximately parallel with each other in the radial direction of the tire and of which the both end portions of each ply are turned up from the inside around bead cores so that the heights from the bead base of the turned-up end portions of the ply of said two ply carcass located axially innermost and the turned-up end portions of the ply of said two ply carcass located axially outermost are form 55 to 65% and 70 to 100% of the height between the bead base and a position at which the axial width between the side wall portions is maximum, respectively, a breaker arranged on the radially outer side of said carcass so that the cords thereof are extended at an angle of 5 degrees to 45 degrees to the circumferential direction of the tire, and bead apexes made of a hard rubber and extending from positions above said bead cores upwardly in said bead toward the side wall portions and radially beyond the uppermost ends of said turned up end portions of the two ply carcass, said crowned tread portion extending arcuately between said side wall portions and having a shoulder groove located in a zone extending from the end of said tread portion at one of said side wall portions arcuately inwardly toward the arcuate center of said tread portion a distance not exceeding 30% of half of the arcuate length of said crowned tread portion between said side wall portions, the depth of said shoulder groove being from 5 to 50% of the depth of the center groove located in a zone extending from the arcuate center of said tread portion toward said shoulder groove a distance from said arcuate center not exceeding 30% of half of the arcuate length of said crowned tread portion, the depths of the grooves between said center groove and said side groove progressively decreasing in depth from said center groove to said side groove.

2. The tire of claim 1, wherein the depth of the shoulder groove is from 15 to 30% of the depth of the center groove.

3. The tire of claim 1, wherein a reinforcing layer is arranged between the bead apex and the turned-up end portion of the carcass so as to extend from the bead portion toward the side wall portion.

4. The tire of claim 1 wherein said bead apexes of a hard rubber extend from said bead core to the ends of said breakers in the side wall of said tire.

* * * * *